United States Patent Office 3,005,017
Patented Oct. 17, 1961

3,005,017
SYNTHESIS OF STEROIDS
Leonard J. Lerner, New Brunswick, Allen I. Laskin, Franklin Township, Somerset County, and Frank L. Weisenborn, Middlebush, N.J., assignors to Olin Mathieson Chemical Corporation, New York, N.Y., a corporation of Virginia
No Drawing. Filed Oct. 7, 1959, Ser. No. 844,853
3 Claims. (Cl. 260—488)

This invention relates to and has for its object, the provision of steroids of the A-norpregnene series having a 16α-hydroxy group or a 16α-acyloxy group. More particularly this invention relates to 16α-hydroxy-A-norprogesterone and esters thereof with hydrocarbon carboxylic acids having less than ten carbon atoms, having the formula:

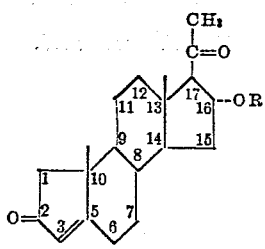

wherein R is hydrogen or the acyl radical of a hydrocarbon carboxylic acid having less than ten carbon atoms.

16α-hydroxy-A-norprogesterone is prepared by subjecting A-norprogesterone to the action of the enzymes of the microorganism *Streptomyces roseochromogenus* under oxidizing conditions, the oxidation being effected either by including the steroid in an aerobic culture of the microorganism, or by bringing together, in an aqueous medium the steroid, air and enzymes of non-proliferating cells of the microorganism.

In general, the conditions for culturing *Streptomyces roseochromogenus* for the purposes of this invention are (except for the inclusion of the steroid to be converted) the same as those for obtaining cultures of various other actinomycetes for the production of antibiotics and/or vitamin $B_{12}$, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers' solubles) or synthetic (i.e., composed of simple, synthesizable organic or inorganic compounds such as ammonium salts, alkali nitrates, amino acids or urea).

An adequate, sterile air supply should be maintained during fermentation, for example by the conventional methods of exposing a large surface of the medium to air, or by utilizing submerged aerated cultures. The steroid may be added to the culture during the incubation period, or included in the medium prior to sterilization or inoculation. The preferred (but not limiting) range of concentration of the steroid in the culture is about 0.01 to 0.10%. The culture period may vary considerably, the range of about 6 to 96 hours being feasible, but not limiting.

The process yields 16α-hydroxy-A-norprogesterone, a steroid useful not only as an intermediate in the preparation of the esters of this invention, but also in common with said ester derivatives, as an anti-desoxycorticosterone agent (i.e., an agent which inhibits the sodium retaining and potassium eliminating activity of desoxycorticosterone and the like). Hence, 16α-hydroxy-A-norprogesterone and esters thereof, particularly esters with organic hydrocarbon carboxylic acids of less than ten carbon atoms (e.g., the lower alkanoic acids as exemplified by acetic, propionic and enanthic acid, the lower alkenoic acids, the aralkanoic acids as exemplified by α-toluic and β-phenylpropionic, the cycloalkane carboxylic acids, the cycloalkane carboxylic acids, and the aromatic acids as exemplified by benzoic and o, m, or p-toluic acid) can be used to counteract side effects of corticoids, congestive heart failure, hypertension, nephrosis, liver cirrhosis, and toxemia of pregnancy, for which purposes they are administered parenterally, being formulated for such administration in the same type of preparations as other parenterally administered steroids, with concentration and/or dosage being based on the activity of the particular steroids.

The esters of 16α-hydroxy-A-norprogesterone are prepared in the usual manner, as by treatment of 16α-hydroxy-A-norprogesterone with the desired acid anhydride or acyl halide in an organic solvent (preferably an organic base such as pyridine) to yield the desired 16α-acyloxy-A-norprogesterone.

16α-hydroxy-A-norprogesterone in being readily converted to A-norprogesterone is further useful as a shelf stable source of A-norprogesterone. To effect this conversion, 16α-hydroxy-A-norprogesterone is treated with mesyl chloride (in pyridine) to yield the 16α-mesyloxy derivative which can be converted to the 16α-iodide by treatment with an alkali metal iodide (in a solvent such as acetic acid) which in turn can be reduced (e.g. with zinc and acetic acid) to yield A-norprogesterone.

The following examples are illustrative of the invention.

EXAMPLE I

*16α-hydroxy-A-norprogesterone*

(a) *Fermentation.*—Surface growth from each of five two-week-old agar slant cultures of *Streptomyces roseochromogenus* (WC 3689), Institute of Microbiology, Rutgers University, New Brunswick, New Jersey, the slant containing a nutrient medium (A):

| | G. |
|---|---|
| Glucose | 10 |
| Yeast extract | 2.5 |
| $K_2HPO_4$ | 1 |
| Agar | 20 |

Distilled water to 1 liter.

is suspended in 2.5 ml. of an 0.01% Dupanol aqueous solution. One ml. portions of the suspension are used to inoculate ten 250 ml. conical flasks, each containing 50 ml. of the following sterilized medium (B):

| | G. |
|---|---|
| Soybean | 15 |
| Glucose | 10 |
| Soybean oil | 2.2 |
| $CaCO_3$ | 2.5 |

Distilled water to 1 liter.

After 24 hours' incubation at 25° with continuous rotary agitation (280 cycles per minute; 2 inch radius), 10% (vol./vol.) transfers are made to sixty 250 ml. conical flasks each containing 50 ml. of freshly sterilized medium B plus 300 micrograms/ml. of A-norprogesterone. (The steroid is added by supplementing each flask with 0.25 ml. of a sterile solution of the steroid in N,N-dimethylformamide containing 60 mg./ml. of steroid. A total of 900 mg. is used.) After 72 hours of further incubation, the contents of the flasks are pooled and the pH adjusted to 4.0. The broth is filtered through a Seitz clarifying pad using Hyflo filter aid. The flasks, mycelium and pads are washed with successive 50 ml. portions of warm water. The combined filtrate and washings have a volume of about 3200 ml.

(b) *Isolation and characterization.*—The combined filtrate and washings are extracted three times with 1 l. portions of chloroform. The combined chloroform extracts are washed with water, saturated sodium chloride solution, dried over sodium sulfate and concentrated to dryness in vacuo. The residue of oily crystalline material is recrystallized from methylene chloride-acetone to give colorless prisms of 16α-hydroxy-A-norprogesterone, about 555 mg., M.P. about 213–214° C.;

$$[\alpha]_D +32° (CHCl_3)$$

$\lambda_{max.}^{alc.}$ 234 m$\mu$ ($\epsilon$=16,300); $\lambda_{max.}^{Nujol}$ 2.99$\mu$, 5.99$\mu$, 6.19$\mu$

*Analysis.*—Calcd. for $C_{20}H_{28}O_3$: C, 75.91; H, 8.92. Found: C, 75.98; H, 8.68.

EXAMPLE II

*16α-acetoxy-A-norprogesterone*

A solution of 22 mg. of 16α-hydroxy-A-norprogesterone in 0.6 ml. of pyridine and 0.6 ml. of acetic anhydride is allowed to stand overnight at room temperature. Removal of the excess reagents in vacuo leaves a crystalline residue (about 24 mg.) which after two recrystallizations from acetone-hexane furnishes pure 16α-acetoxy-A-norprogesterone.

Similarly by substituting other acid anhydrides, such as propionic anhydride, or acyl halides, such as benzoyl chloride, for the acetic anhydride in the procedure of Example II, the corresponding ester derivatives are produced.

The invention may be variously embodied within the scope of the appended claims.

What is claimed is:

1. A compound selected from the group consisting of 16α-hydroxy-A-norprogesterone and esters thereof with hydrocarbyl carboxylic acids having less than ten carbon atoms.
2. 16α-hydroxy-A-norprogesterone.
3. 16α-hydroxy-A-norprogesterone acetate.

No references cited.